United States Patent
Sicard et al.

(10) Patent No.: US 10,526,893 B2
(45) Date of Patent: Jan. 7, 2020

(54) TURBINE ROTOR FOR A GAS TURBINE ENGINE

(71) Applicant: SAFRAN AIRCRAFT ENGINES, Paris (FR)

(72) Inventors: Josselin Luc Florent Sicard, Savigny le Temple (FR); Bertrand Pellaton, Verneuil l'Etang (FR); Hélène Marie Barret, Paris (FR); Benoit Guillaume Silet, Yerres (FR); Anne-Flore Karine Houlet, Antony (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 427 days.

(21) Appl. No.: 15/312,850

(22) PCT Filed: May 7, 2015

(86) PCT No.: PCT/FR2015/051211
§ 371 (c)(1),
(2) Date: Nov. 21, 2016

(87) PCT Pub. No.: WO2015/177429
PCT Pub. Date: Nov. 26, 2015

(65) Prior Publication Data
US 2017/0167264 A1    Jun. 15, 2017

(30) Foreign Application Priority Data
May 20, 2014    (FR) ...................................... 14 54500

(51) Int. Cl.
*F01D 5/08*    (2006.01)
*F01D 11/08*    (2006.01)
*F01D 11/00*    (2006.01)

(52) U.S. Cl.
CPC ............. *F01D 5/081* (2013.01); *F01D 11/001* (2013.01); *F01D 11/08* (2013.01); *Y02T 50/676* (2013.01)

(58) Field of Classification Search
CPC ........ F01D 5/081; F01D 11/001; F01D 11/08; F01D 5/088; F01D 11/005; F01D 11/006; F01D 11/008; Y02T 50/676
See application file for complete search history.

(56) References Cited

U.S. PATENT DOCUMENTS 3,575,528 A    4/1971    Beam, Jr. et al.
4,526,508 A *  7/1985    Antonellis .............. F01D 5/066
                                                    415/173.7

(Continued)

FOREIGN PATENT DOCUMENTS

DE    11 06 557 B     5/1961
DE    33 10 529 A1   10/1996

(Continued)

OTHER PUBLICATIONS

International Search Report as issued in International Patent Application No. PCT/FR2015/051211, dated Jul. 10, 2015.

*Primary Examiner* — Jason D Shanske
*Assistant Examiner* — Eric J Zamora Alvarez
(74) *Attorney, Agent, or Firm* — Pillsbury Winthrop Shaw Pittman LLP

(57) ABSTRACT

A turbine rotor for a gas turbine engine, includes an upstream turbine disk; a downstream turbine disk; an annular flange; a first ferrule connecting the upstream turbine disk to the annular flange; a second ferrule connecting the downstream turbine disk to the annular flange; an air flow separator device including: a first part, forming a first ring, arranged between the upstream turbine disk and the downstream turbine disk; a second part, forming a second ring, having a first portion facing the downstream turbine disk, (Continued)

and a second portion arranged between the first ferrule and the second ferrule; and a thermal insulation area arranged between the first part and the second part.

10 Claims, 1 Drawing Sheet

(56) References Cited

U.S. PATENT DOCUMENTS

| | | | | |
|---|---|---|---|---|
| 4,730,982 A * | 3/1988 | Kervistin | ............... | F01D 5/084 415/115 |
| 5,833,244 A * | 11/1998 | Salt | ...................... | F01D 11/001 277/421 |
| 8,382,432 B2 * | 2/2013 | Grissino | .................. | F16J 15/44 415/115 |
| 9,188,008 B2 * | 11/2015 | Coutandin | .............. | F01D 5/081 |

FOREIGN PATENT DOCUMENTS

| | | |
|---|---|---|
| EP | 0 169 798 A1 | 1/1986 |
| EP | 1 264 964 A1 | 12/2002 |
| EP | 1 736 635 A2 | 12/2006 |
| GB | 2 307 520 A | 5/1997 |

\* cited by examiner

TURBINE ROTOR FOR A GAS TURBINE ENGINE

CROSS REFERENCE TO RELATED APPLICATIONS

This application is the U.S. National Stage of PCT/FR2015/051211, filed May 7, 2015, which in turn claims priority to French Patent Application No. 1454500 filed May 20, 2014, the entire contents of all applications are incorporated herein by reference in their entireties.

TECHNICAL FIELD OF THE INVENTION

The invention relates to a turbine rotor for a gas turbine engine, intended to be fitted to aircraft, and more specifically to a low- or medium-pressure turbine rotor.

STATE OF THE PRIOR ART

In turbomachines, it is common to use air taken in particular from the high-pressure compressor to cool the parts located in the thermally hot areas, downstream from the turbomachine's combustion chamber. For example, the rotor of the low-pressure turbine must be ventilated by "cool" air in order to cool the links or attachments of the blades on the rotor disks by an appropriate airflow in the area of the link between the root of the blades and the rim of the disk.

FIG. 1 illustrates schematically a turbine rotor of the prior art, including an upstream disk 1, a downstream disk 5 and an annular flange b. A first ferrule 11 connects the upstream disk 1 to the annular flange b. A second ferrule 51 connects the downstream disk 5 to the annular flange b. The rotor also includes a flow separator device 4, a second portion 41 of which is arranged between the first ferrule 11 and the second ferrule 51. These three elements, namely portion 41, first ferrule 11 and second ferrule 51, are held together by the annular flange b. The flow separator device is called a labyrinth ring, due to its 360° G annular shape and the presence of lips c. The lips c of the labyrinth ring 4 ensures sealing between areas of the turbine which are at different pressures. They are positioned facing abradable materials cartridges on the stator part. These cartridges prevent the lips being destroyed when they come into contact with the stator.

The flow separator device 4 in this rotor is Y-shaped in order to protect the ferrules of the disks and to channel the air flows which cool the disks. Three heat flows f1, f2 and fv cohabit within the rotor configuration: a first flow f1 for ventilating the upstream disk, a second flow f2 for ventilating the downstream disk, and a stream flow path fv from an air stream of the turbine.

In order to cool the upstream disk, the first ventilation flow f1 passes (in the direction of the arrow) through the upstream disk, through recesses made in the upstream disk 1, and then through at least one hole 45 made in flow separator device 4.

In order to cool the downstream disk, the second ventilation flow f2 passes (in the direction of the arrow) through a plurality of lunules (not visible in FIG. 1) of the flow separator device 4 and through the downstream disk, through recesses made in the downstream disk 5.

The device of FIG. 1 has the major disadvantage that there are thermal gradients in the annular flange due to fact that the different airstreams, with different temperatures, cohabite. The annular flange holds together the ferrule of the upstream disk 11, the ferrule of the downstream disk 51, and the flow separator device 4. The thermal gradients cause mechanical stresses on the annular flange. These mechanical stresses may damage or fracture the annular flange.

DESCRIPTION OF THE INVENTION

The invention seeks to remedy all or a part of the disadvantages of the state of the art identified above, and in particular to propose means enabling to the mechanical stresses in the annular flange connecting an upstream turbine disk and a downstream turbine disk of a turbine rotor to be reduced.

To this end, one aspect of the invention relates to a turbine rotor for a gas turbine engine, wherein the said rotor includes:
- an upstream turbine disk;
- a downstream turbine disk;
- an annular flange;
- a first ferrule connecting the upstream turbine disk to the annular flange;
- a second ferrule connecting the downstream turbine disk to the annular flange;
- an air flow separator device including:
  - a first part, forming a first ring, arranged between the upstream turbine disk and the downstream turbine disk;
  - a second part, forming a second ring, said second part having a first portion facing the downstream turbine disk, and a second portion arranged between the first ferrule and the second ferrule;
- and a thermal insulation area arranged between the first part and the second part.

Due to this configuration, the air ventilation flows between the upstream part and the downstream part are dissociated. Indeed, the thermal insulation area, together with the first part and the second part, form a physical barrier between the ventilation flow cooling the upstream disk and the ventilation flow cooling the downstream disk. Due to the dissociation of the air ventilation flows, the thermal gradient in the flange is reduced or eliminated, and thus the mechanical stresses in the flange are reduced or eliminated. The presence of the thermal insulation area prevents the areas in contact with a cold air flow and a hot air flow being connected to one another, in order to reduce the mechanical stresses due to the thermal gradients.

In addition to the main characteristics which have just been mentioned in the preceding paragraph, the rotor according to the invention may have one or more of the following possible additional characteristics, considered individually or in technically possible combinations:
- the thermal insulation area is a space filled with air;
- the thermal insulation area is arranged between a lower part of the first part and an upper part of the second part, and is facing the second ferrule;
- the first part of the flow separator device and the second part of the flow separator device are a single piece;
- the first part of the flow separator device and the second part of the flow separator device are separate pieces;
- the first part of the flow separator device is a labyrinth seal, where the said labyrinth seal includes at least one lip;
- a third portion of the first part is supported against the upstream disk, a fourth portion of the first part is supported against the first portion of the second part, where the said first portion is configured to hold the first part radially. The first part is thus held supported between the upstream disk and the second part, where this latter is itself held supported against the upstream disk and by the annular flange;

the annular flange holds the first ferrule, the second ferrule and the second part of the flow separator device between them.

The invention also relates to a turbomachine including a rotor according to one of the embodiments described above.

The invention also relates to an aircraft including a rotor according to one of the embodiments described above.

BRIEF DESCRIPTION OF THE FIGURES

Other characteristics and advantages of the invention will be seen clearly on reading the description below, with reference to the appended figures, which illustrate.

For greater clarity, identical or similar elements are identified by identical reference signs in all the figures.

DETAILED DESCRIPTION OF ONE IMPLEMENTATION

Figure 1:
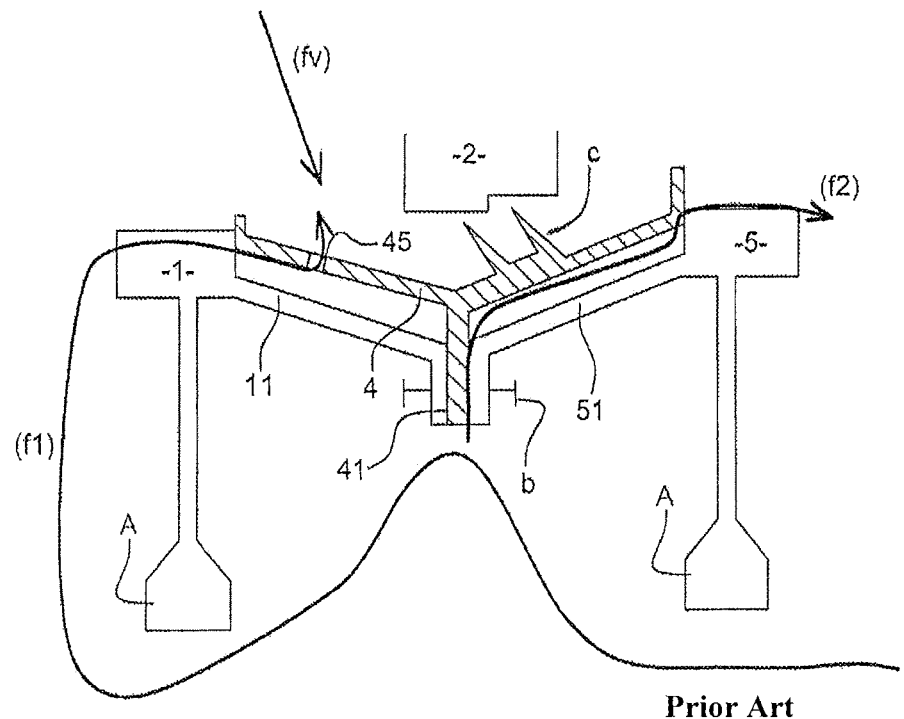
FIG. 1, a schematic section view of a turbine rotor for a gas turbine engine according to the prior art.
Figure 2:
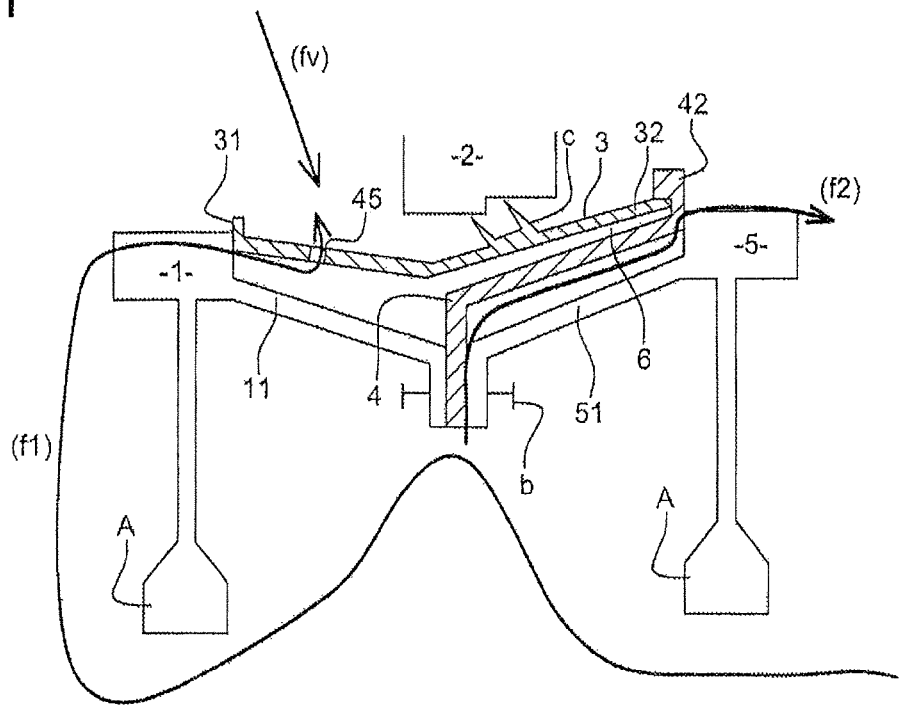
FIG. 2, a schematic section view of a turbine rotor for a gas turbine engine according to one embodiment of the invention.

FIG. 2 illustrates schematically a section view of a turbine rotor for a gas turbine engine of an aircraft, and in particular a rotor of a low-pressure turbine. The rotor includes an upstream turbine disk 1, and a downstream turbine disk 5. Upstream turbine disk 1 forms part, for example, of the first stage of the low-pressure turbine, and the downstream turbine disk 5 forms part of the second stage of the low-pressure turbine.

The rotor also includes a first ferrule 11 and a second ferrule 51. The first ferrule 11 and the second ferrule 51 are cylindrical ferrules. The first ferrule 11 connects the upstream disk 1 to an annular flange b. The second ferrule 51 connects the downstream disk 1 to an annular flange b. The annular flange b enables a connection between first ferrule 11 and second ferrule 51 to be maintained.

The rotor also includes an air flow separator device (3, 4). The function of this device is to allow the air flows flowing in the rotor to be separated, i.e. a first flow f1 (flow direction illustrated by an arrow in FIG. 2) which is used to ventilate upstream disk 1, and a second flow f2 (flow direction illustrated by an arrow in FIG. 2) which is used to ventilate downstream disk 5.

The flow separator device includes a first part 3 and a second part 4. In this example embodiment, the first part 3 and the second part 4 are separate parts. The first part 3, forming a first ring 3, is arranged between the upstream turbine disk 1 and the downstream turbine disk 5. The first part, in this example embodiment, is a labyrinth seal, and includes at least one lip c. The lip c, when the turbine is in operation, comes into contact with an abradable material of a cartridge 2 of the turbine's stator. The second part 4, forming a second ring, is arranged between the downstream turbine disk 5 and the first 11 and the second 51 ferrules. The second part 4 includes a first portion 42 arranged facing the downstream turbine disk 5. The first portion 42 is here supported against the downstream turbine disk 5. The second part 4 includes a second portion arranged between the first ferrule 11 and the second ferrule 51 and held in position by the annular flange b. The flow separator device also includes a thermal insulation area 6 between the first part 3 and the second part 4. In this embodiment, the thermal insulation area 6 is a space filled with air between the two separate parts, namely the first ring 3 and the second ring 4. The thermal insulation area 6 is located between a lower part of the first ring 3 and an upper part of the second ring 4. It is facing at least the second ferrule 51, which connects the downstream turbine disk 5 to the annular flange b. In this embodiment, it is facing both the second ferrule 51 and the first ferrule 11, and the thermal insulation area 6 is a space filled with air insulating the annular flange from the first ventilation flow f1 and from the second ventilation flow f2.

Regarding the positioning of first part 3, a third portion 31 of the first part is supported against the upstream turbine disk 1 and a fourth portion 32 of the first part is supported against the first portion 42 of the second part. The first portion 42 of the second part radially holds the first part 3. In this embodiment, the first portion 42 forms a hook in which the fourth portion 32 of the first part is inserted.

The rotor has a first ventilation configuration comprising a plurality of recesses (not visible) of the upstream disk 1 and at least one hole 45 of a wall of the first part of the flow separator device. The first ventilation configuration allows the first ventilation flow f1 to flow to ventilate the upstream disk. The first ventilation flow f1 meets stream flow path fv from an air stream when it exits from the hole 45 made in the wall of the first part of the flow separator device. The rotor also comprises a second ventilation configuration comprising a plurality of lunules (not visible) made in the second part of the flow separator device so as to cause a second ventilation flow f2 to flow between the first ferrule and the second ferrule towards a space between the second part 4 of the flow separator device and the second ferrule 51. The second ventilation configuration also includes a plurality of recesses made in the downstream disk 5. The second ventilation configuration allows the second ventilation flow f2 to flow to ventilate the downstream disk.

The invention is not limited to the embodiments described above with reference to the figures, and variants could be envisaged without going beyond the scope of the invention.

The invention claimed is:

1. A turbine rotor for a gas turbine engine, said turbine rotor comprising:

an upstream turbine disk passed through by a first ventilation flow;

a downstream turbine disk passed through by a second ventilation flow;

an annular flange;

a first ferrule connecting the upstream turbine disk to the annular flange;

a second ferrule connecting the downstream turbine disk to the annular flange;

an air flow separator device;

wherein the air flow separator device includes a first part, forming a first ring, arranged between the upstream turbine disk and the downstream turbine disk;

a second part, forming a second ring, said second part having a first portion facing the downstream turbine disk, and a second portion arranged between the first ferrule and the second ferrule; and a thermal insulation area arranged between the first part and the second part, the thermal insulation area, together with the first part and the second part, forming a physical barrier between the first ventilation flow cooling the upstream disk and the second ventilation flow cooling the downstream disk, said physical barrier dissociating said first and second ventilation flows.

2. The turbine rotor according to claim 1, wherein the thermal insulation area is a space filled with air.

3. The turbine rotor according to claim 1, wherein the thermal insulation area is arranged between a lower part of the first part and an upper part of the second part, and is facing the second ferrule.

4. The turbine rotor according to claim 1, wherein the first part of the air flow separator device and the second part of the air flow separator device are a single piece.

5. The turbine rotor according to claim 1, wherein the first part of the air flow separator device and the second part of the air flow separator device are separate pieces.

6. The turbine rotor according to claim 5, wherein the first part of the air flow separator device is a labyrinth seal, where the labyrinth seal includes at least one lip.

7. The turbine rotor according to claim 6, wherein a first portion of the first part is supported against the upstream disk, a second portion of the first part is supported against the first portion of the second part, said first portion of the second part being configured to hold the first part radially.

8. The turbine rotor according to claim 1, wherein the annular flange maintains connection between the first ferrule, the second ferrule and the second part of the air flow separator device.

9. A turbomaehine comprising the turbine rotor according to claim 1.

10. An aircraft comprising the turbine rotor according to claim 1.

* * * * *